United States Patent [19]
Fort

[11] 3,752,293
[45] Aug. 14, 1973

[54] ARTICLE GROUPING SYSTEM
[75] Inventor: Paul H. Fort, Anderson, Ind.
[73] Assignee: Lynch Machinery, Anderson, Ind.
[22] Filed: Dec. 17, 1970
[21] Appl. No.: 99,008

[52] U.S. Cl. ............................. 198/30, 198/33 AA
[51] Int. Cl. ..................... B65g 47/24, B65g 47/26
[58] Field of Search ........... 198/29, 30, 32, 220 BA, 198/33 AA

[56] References Cited
UNITED STATES PATENTS
| | | | |
|---|---|---|---|
| 3,469,672 | 9/1969 | Stutske et al. | 198/30 |
| 1,079,165 | 11/1913 | Conte | 198/30 |
| 2,596,228 | 5/1952 | Fletcher | 198/30 |
| 791,243 | 5/1905 | Carlson | 198/30 |

Primary Examiner—Edward A. Sroka
Attorney—Molinare, Allegretti, Newitt & Witcoff

[57] ABSTRACT

An article grouping apparatus includes a downwardly inclined fanshaped platform adapted to columnate and transport a plurality of articles. The apparatus includes a first conveyor adapted to receive, space apart and further columnate articles from the vibrating platform and a second conveyor adapted to receive articles from the first conveyor and to transport the articles in columns for inspection and processing.

The fan-shaped platform includes a plurality of troughs adapted to accommodate the articles and inclined surfaces flanking the troughs adapted to urge the articles into the troughs. Wire members connected to the inclined surface align the non-aligned articles. Discharge openings are defined on the inclined surfaces to discharge articles traveling on the inclined surfaces before the articles are deposited onto the first conveyor.

19 Claims, 7 Drawing Figures

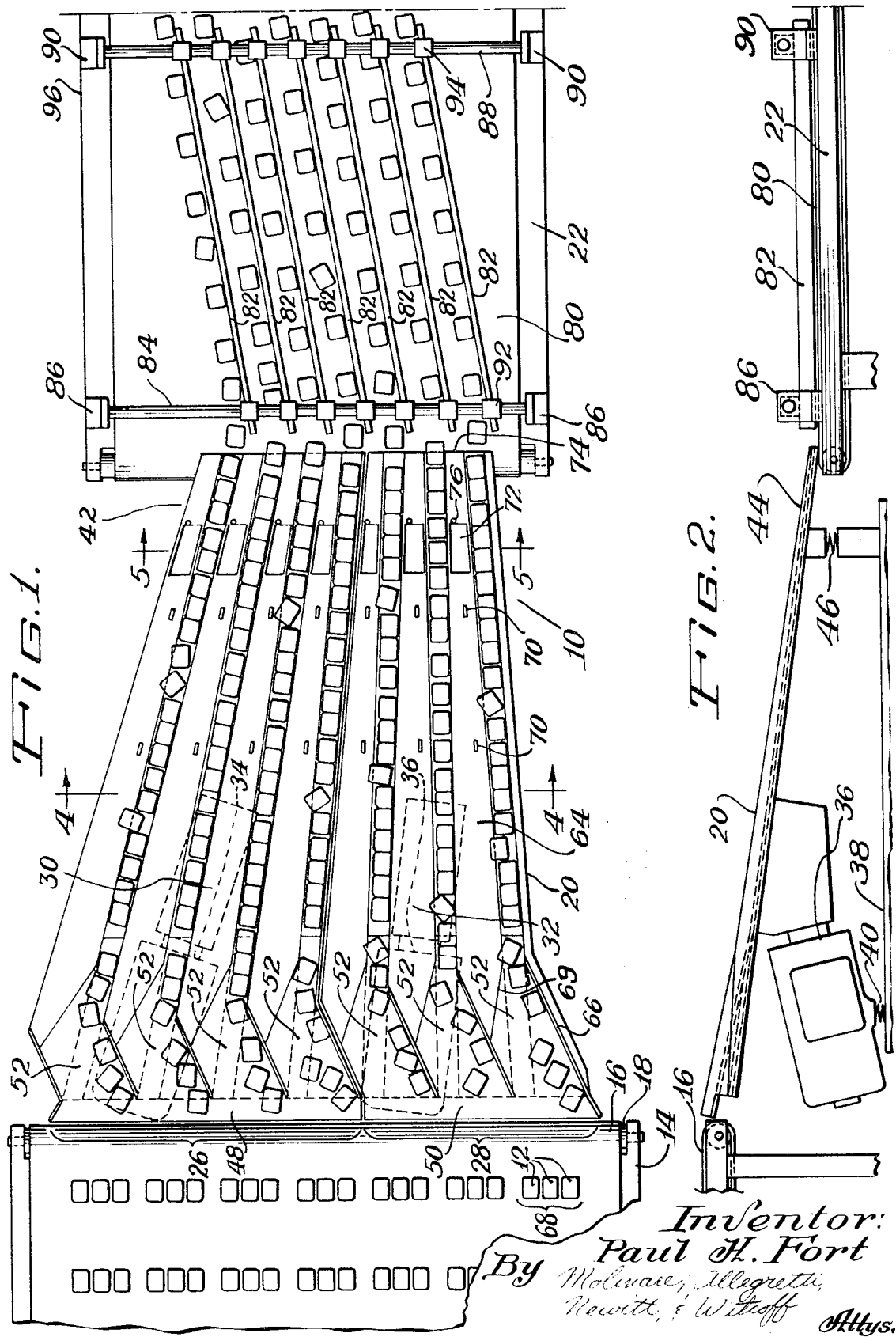

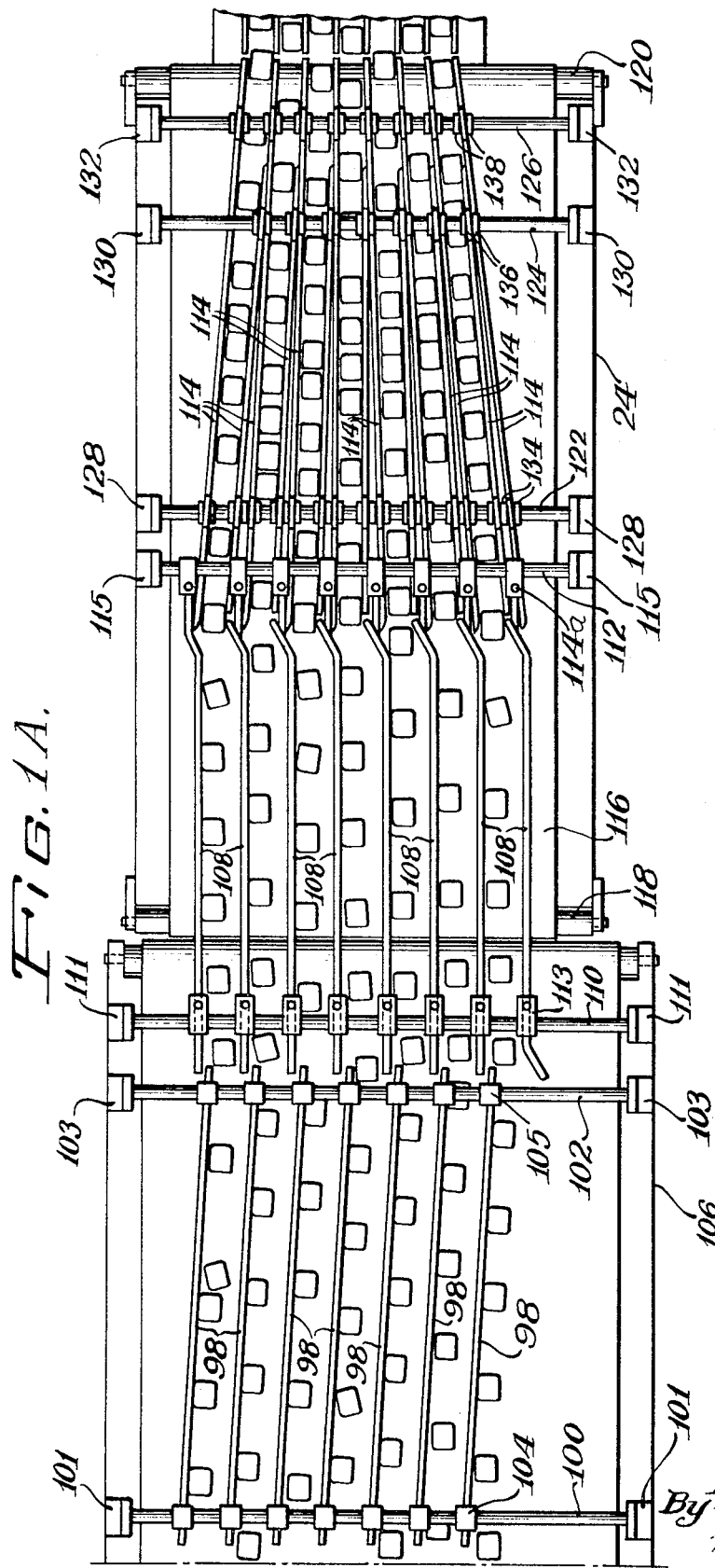
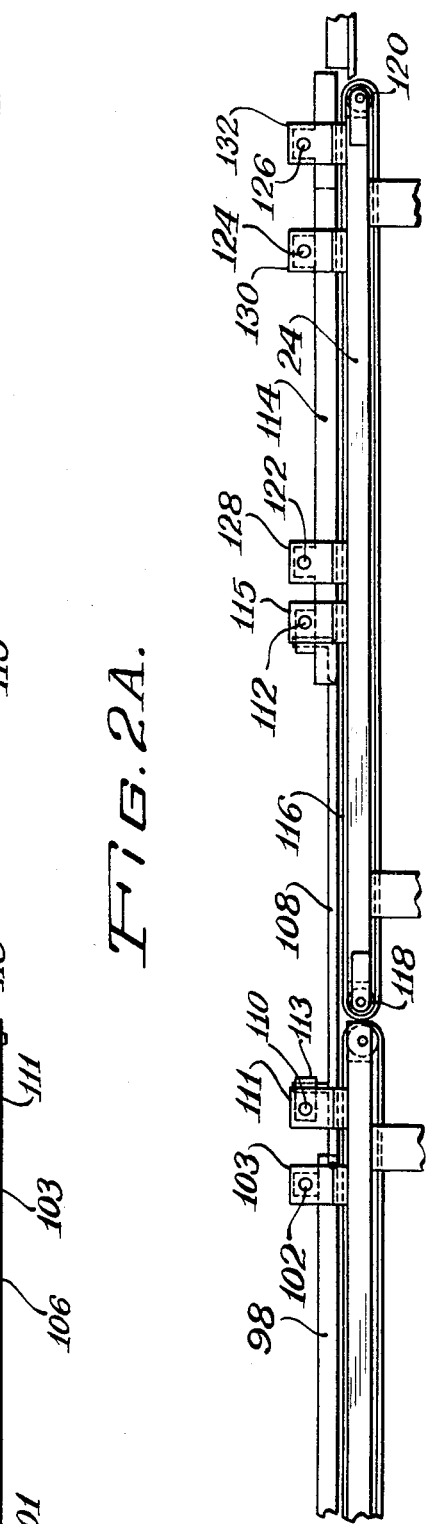

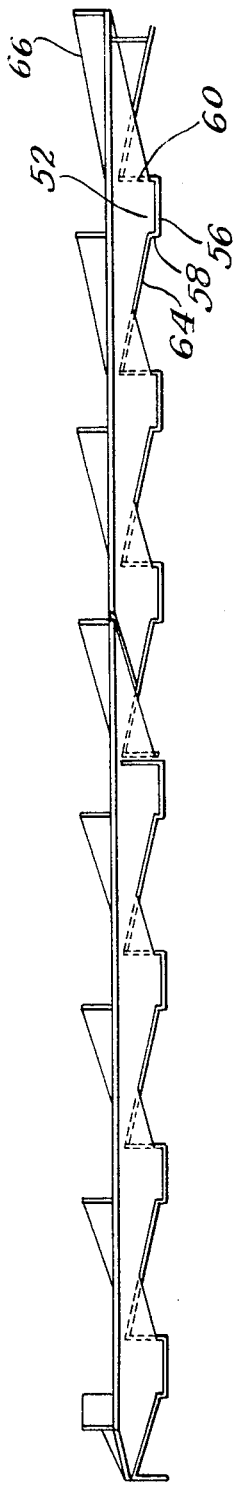
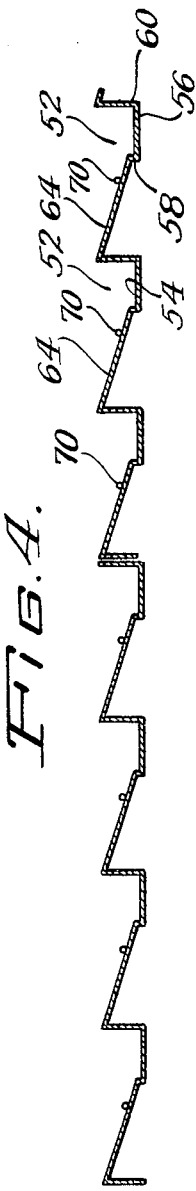
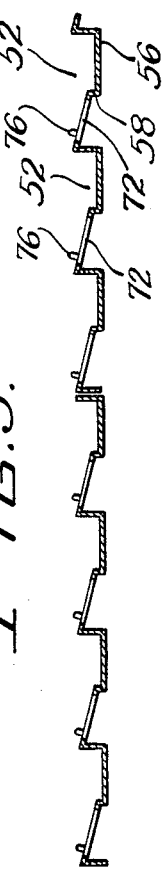
Inventor:
Paul H. Fort

ARTICLE GROUPING SYSTEM

BACKGROUND OF THE INVENTION

Grouping systems have been devised in the prior art for the grouping of uniformly shaped articles. An example of such prior art device is shown in U.S. Pat. No. 3,469,672 by W. A. Stutske et al., entitled Vibratory Grouping Apparatus. The Stutske device is adapted for use with another grouping apparatus disclosed in the U.S. Pat. application Ser. No. 670,906 by Bruce Mottweiler entitled Conveying System, now U.S. Pat. No. 3,528,213.

In the Stutske Vibratory Grouping Apparatus, a vibrating platform downwardly inclined in the direction of article travel is provided. The platform includes a number of troughs having surfaces flanking each trough and inclined downwardly toward the troughs. These inclined surfaces have vane guide members connected thereto and adapted to divert articles into the bottom surfaces of the troughs. In this manner the articles are urged into columns along the bottom surfaces of the troughs. In the Mottweiler device, a number of spaced rows for transporting articles are provided together with apparatus for diverting the outermost rows of articles moving from the conveyor to a series of processing machines.

Although the Stutske apparatus functions generally to align articles into columns, it was not adapted for use with "over square" shaped articles. These are articles having the length thereof slightly greater than the width thereof. It has been found that such articles are very difficult to align into lengthwise moving columns. The improved grouping apparatus of this invention is designed to alleviate this and other problems.

This invention is generally related to an improved article grouping apparatus. The invention is designed to continually columnate and group a number of "over square" articles such as candy bars. In the processing of such articles, it is desirable to transport such articles to processing machines in columns with the articles arranged uniformly. It is also desirable to align and transport such articles in an efficient manner with a minimum of jamming of the articles.

SUMMARY OF THE INVENTION

The present invention relates generally to an improved article grouping apparatus to align articles in at least one column. The improved grouping apparatus comprises generally an article receiving platform mounted to a base for vibratory movement and inclined downwardly in the direction of article travel. The platform includes at least one trough adapted to accommodate the articles in a column. A surface is inclined downwardly toward the trough on one side thereof for inducing the articles into the trough. At least one article group break up guide member is connected to the receiving end of the platform at an angle with respect to the trough. The guide member is adapted to funnel the articles into the trough. Means for continuously vibrating the platform are connected to the platform so that the articles may be moved downwardly along the platform in response to vibration thereof.

This invention also includes a first conveyor having an endless rotatable belt for receiving articles from the lower end of the platform. Two sets of guide plows with at least one guide plow in each set are connected to the conveyor. The first set of plows is connected to receive the articles from the platform and move them in the direction of belt travel and towards one side of the conveyor belt. The second set of plows is connected to receive articles from the first set of plows and move them in the direction of belt travel and towards the opposite side of the conveyor belt.

In a preferred embodiment the vibrating platform includes U-shaped wire members connected thereto and adapted to align non-aligned articles. Discharge openings are defined downwardly in the direction of article travel with respect to the wire members on the inclined surfaces of the troughs. The non-aligned articles passing over the U-shaped wire members are discharged from the platform through the discharge openings before being deposited on the first conveyor.

Also in a preferred embodiment, a second conveyor is provided having guide rods adapted to receive articles from the second set of guide plows and guide the articles from the first conveyor to the second conveyor. The second conveyor also includes tapered guides adapted to receive articles from the guide rods so that the articles are aligned, columnated and moved close together for further processing.

BRIEF DESCRIPTION OF THE DRAWINGS

FIG. 1 is a top view of a portion of the improved article grouping apparatus of this invention;

FIG. 1A is a top view of the other portion of the apparatus of this invention;

FIG. 2 is a side view of the apparatus shown in FIG. 1;

FIG. 2A is a side view of the apparatus of this invention shown in FIG. 1A;

FIG. 3 is an end elevational view of the article receiving end of the apparatus shown in FIG. 1;

FIG. 4 is a cross-sectional view of the article receiving platform shown in FIG. 1 taken substantially along the lines 4—4;

FIG. 5 is a cross-sectional view of the article receiving platform shown in FIG. 1 taken substantially along the lines 5—5.

DETAILED DESCRIPTION OF THE PREFERRED EMBODIMENT

An overall view of the improved article grouping apparatus 10 of this invention is shown in FIGS. 1 and 1A. The articles 12 such as candy bars which are grouping apparatus 10 is designed to columnate and align are shown generally as having "over square" shape. In other words, the length of these articles is slightly greater than the width. These articles 12 move from left to right as shown in FIG. 1. The articles 12 are supplied to The grouping apparatus 10 by means of a feeding conveyor 14 having a continuously rotatable feedbelt 16 rotating about a fixed roller member 18.

The grouping apparatus 10 generally includes a fan-shaped article receiving platform 20, a first conveyor 22 and a second conveyor 24. The first conveyor 22 is positioned to receive articles 12 from the platform 20. The second conveyor 24 is positioned to receive articles 12 from the first conveyor 22. For greater clarity, these components of the overall grouping apparatus 10 will be described individually.

THE ARTICLE RECEIVING PLATFORM

Referring generally to FIGS. 1, 1A, 2 and 2A the platform 20 is separated into two platform sections 26 and 28. These sections 26 and 28 are inclined downwardly in the direction of article travel. The angle of inclination is approximately 10°, although this may be varied for various applications. The articles 12 are moved along the vibrating platform 20 by a combination of vibrational and gravitational forces. It has been found that the separation of the platform into two platform sections 26 and 28 facilitates the vibration of the platform 20 and, therefore, the movement of articles 12.

Sections 26 and 28 are separately connected at article receiving ends 30 and 32 to vibratory drivers 34 and 36. The driver 36 is connected to a base 38 by means of a spring member 40. It is to be understood that the driver 34 is similarly connected to the base 38, although such connection does not appear in the side view of FIG. 2.

Article depositing end 44 of section 28 is connected to the base 38 by means of a spring member 46. It is to be understood that the article depositing end 42 of the platform section 26 is similarly connected to the base 38, although this connection also does not appear in the side view of FIG. 2.

The axes of the drivers 34 and 36 are connected to the platform sections 26 and 28 at a predetermined angle with respect to the channel 52. The predetermined angle obtains an optimum combination of the rate of flow of the articles 12 down the vibrating platform 20 and of the force of the guide members 66 against the articles 12 as they are broken up from groups 68 into individually aligned articles 12.

In the preferred embodiment shown in FIG. 1, the articles 12, such as candy bars, are delivered on the endless conveyor belt 16 in rows comprising seven groups of three articles in each group. These articles 12 are delivered to the leading edges 48 and 50 respectively of the vibrating platform sections 26 and 28. The platform 20 includes seven separate troughs 52. Four of the troughs 52 are contained upon platform section 26 and the remaining three troughs 52 are contained on platform section 28. These troughs 52 are tapered together in the direction of article travel to bring the articles 12 close together as the articles 12 travel from left to right. Although the geometry of the troughs 52 varies slightly according to the position of the trough 52 on the vibrating platform 20, the elements of the troughs 52 are substantially identical and, therefore, a description of one of the troughs 52 will serve to fully describe the remaining six troughs 52.

As may be seen in FIGS. 3, 4 and 5, the trough 52 includes a bottom section 56 and upright side sections 58 to 60. A surface 64 is gradually inclined toward the side section 58 of the trough 52.

The articles 12 are of "over square" shape, each having its length somewhat greater than its width. The trough 52 is defined to accommodate the articles 12 lengthwise, singlely in a column along the trough 52 with one side of each article 12 adjacent the side surface 58 and the other side of each article 12 adjacent the side surface 60 of the trough 52.

Trough 52 includes article group break up guide member 66. The guide member 66 is connected at an angle of approximately 30° from the direction of travel of articles on the feeding conveyor 14. The guide member 66 tapers downwardly toward the side surface 60. During the operation of the grouping apparatus 10, each of the groups 68 of articles 12 is broken up for columnation against the guide member 66. The groups 68 of articles 12 are referred to for convenience sake. In actual operation the articles 12 are equally spaced apart on the feed conveyor. The leading edge 69 of the gradually inclined surface 64 diverts the articles 12 onto the trough 52.

It has been found that with articles 12 such as "over square" candy bars, approximately 70 percent of the articles 12 are broken up onto single file columns within the troughs 52. As will be described hereafter, this invention includes means for aligning substatially all of the remaining 30 percent of the articles 12 still not aligned.

Two article aligning members which take the form of U-shaped wire members 70 are connected as by soldering to the gradually inclined surface 64. When the non-aligned articles 12 pass these wire members 70, they are either urged into alignment or caused to "jump" over the wire members 70. The wire members 70 align a maximum number of the articles 12 without causing any jamming of the articles 12 as they move thereby. A discharge opening 72 is defined on the surface 64 downwardly of the wire members 70. In the event that an article 12 jumps over both wire members 70, without being aligned, such an article 12 is discharged through the discharge opening 72 which is nearby the article depositing end 74 of the platform 20. An upwardly extending abutment 76 is connected to the gradually inclined surface adjacent the discharge opening 72. The abutment member 76 cooperates with the discharge opening 72 to unload the non-aligned articles 12 which pass over the opening 72.

It is important to discharge such articles 12 since the platform 20 is sensitive to over loading. When the platform 20 receives a flow of articles 12 in excess of its capacity, the excess may be readily discharged through opening 72.

THE FIRST TAKE-OFF CONVEYOR

The first conveyor 22 is provided to receive the articles 12 from the platform 20. The width of the conveyor 22 is wider than the width of the article depositing end 74 of the platform 20. The conveyor 22 includes an endless rotatable belt 80 which rotates to move the articles 12 toward the right as shown in FIGS. 1, 1A, 2 and 2A. The articles 12 on the end 74 of the platform 20 are grouped so densely that orientation of the non-aligned articles is difficult. The endless belt 80 is rotated at a speed greater than the speed of movement of the articles 12 along the vibrating platform 20 so that the articles 12 are spaced apart along the conveyor 22. This spacing of the articles 12 on the belt 80 facilitates alignment of those articles 12 which are not aligned on the platform 20.

The conveyor 22 includes a first set of substantially identical guide plows 82. These plows 82 are formed of stainless steel, but may be formed of other suitable material. Only one of the guide plows 82 will be described and it is understood that this description applies to all seven guide plows 82. A threaded shaft 84 is rigidly connected to mounting brackets 86 at opposite sides of the conveyor 22. In like manner a threaded shaft 88 is rigidly connected across the endless belt 80 to mounting brackets 90 at opposite sides of the conveyor 22. The guide plow 82 is connected between shafts 84 and 88 by means of adjustable fixtures 92 and 94 which may be moved along the length of the threaded shafts 84 and 88 to provide the desired angle for the guide plow 82 with respect to the direction of travel of the endless belt 80.

It has been found that approximately 10% of the articles 12 are non-aligned after passing the article discharge end 74 of the vibrating platform 20. The guide plows 82 are mounted at an angle less than 45° toward one side 96 of the conveyor 22 so that when the articles 12 are discharged on to the endless belt 80, they are moved both in the direction of belt travel, and sideways across the belt 80. In this manner, the friction of the plows 82 against the articles 12 urges the non-aligned articles 12 to rotate clockwise into alignment.

A second set of guide plows 98 formed of stainless steel are connected to the conveyor 22 by means of threaded shafts 100 and 102 and adjustable guide fixtures 104 and 105. The shafts 100 and 102 are suspended above the conveyor 22 by mounting brackets 101 and 103 respectively. The plow guides 98 are directed at an angle less than 45° toward the opposite side 106 of the conveyor 22.

Because the articles 12 are moved toward the opposite side 106 of the conveyor 22, friction between the article 12 and plows 98 acts to rotate the non-aligned articles 12 counterclockwise into alignment. By rotating the non-aligned articles 12 first one way and then the other way, a maximum number of articles 12 are aligned.

The angle by which the plows 98 deviate from the direction of travel of the belt 80 is somewhat less than the angle of the plows 82 away from the direction of belt travel. This design allows the articles 12 to stabilize during the transfer from plows 82 to plows 98. Such stabilization is important since some of the articles 12 may be rotating against the first set of plows 82.

THE SECOND TAKE-OFF CONVEYOR

After passing the second set of guide plows 98, the articles enter a section of guide rods 108 formed of stainless steel or other suitable material. These guide rods 108 are connected between conveyor 22 and a second conveyor 24 as follows. A threaded shaft 110 is connected across the article depositing end of conveyor 22 by means of mounting brackets 111. Another threaded shaft 112 is connected across the center portion of conveyor 24 by means of mounting brackets 115. The guide rods 108 are connected between the shaft 110 and 112 by means of adjustable fixtures 113 and 114a.

As may be seen in side view of FIG. 2A, these guide rods 108 are relatively shorter in height than the second set of guide plows 98. The size of the guide rods 108 allows an operator to observe and monitor the articles 12 moving thereby, and if necessary, to reject any articles 12 having faults. The articles 12 are moved along the conveyor 24 by means of an endless rotatable belt 116. This belt is mounted between rollers 118 and 120. The guide rods 108 are connected substantially parallel to the direction of travel of belt 116, although the rods 108 may be easily adjusted at a different angle.

After the articles 12 are discharged from the guide rods 108, they are channeled into tapering lane guide rails 114 of stainless steel or other suitable material. The guide rails 114 taper together in the direction of article travel (towards the right). In this manner, the articles are brought closer together for discharge from the endless belt 116.

The rails 114 are connected to the conveyor 24 by means of threaded shafts 122, 124 and 126. These shafts are suspended across the conveyor 24 by mounting brackets 128, 130 and 132. The rails 114 are rigidly connected between the shafts 122, 124 and 126 by means of adjustable fixtures 134, 136 and 138 respectively. There are two guide rails 114 for each column of articles 12. Thus, the rotational freedom of the articles 12 is negligable and the articles 12 may be fed for further processing in uniform, proximate columns at the end of second conveyor 24

With the improved grouping apparatus 10 of this invention, it is possible to columnate and transport groups of articles 12 with a minimum of jamming and a maximum of efficiency. In the preferred embodiment which has been described, the articles 12 travel from an endless belt 16 towards the grouping apparatus 10 of this invention in rows of 21 articles per row, each row having seven groups of three articles per group.

It has been found that the improved grouping apparatus 10 of this invention may employ five troughs 52 receiving rows of articles, each row having five groups of four articles per group. This and other combinations may be employed without departing from the principals of this invention.

In the preferred embodiment of this invention, the articles 12 are candy bars having dimensions of approximately 1-19/32 inches wide by fifteen-sixteenths inches high by 1-5/8 inches long. The apparatus of this invention may also be adapted for other articles. In FIG. 1, the articles 12 are fed to the grouping apparatus on an endless feedbelt 16 which belt is approximately 42 inches wide and 4 feet in total length. It has been found that the improved article grouping apparatus 10 can adequately accommodate the articles 12 moving toward the apparatus 10 at a rate of 110 articles per column of articles per minute. This corresponds to a speed of 55 feet per minute for the feedbelt 16 with the article rows spaced approximately 6 inches from center to center.

The product flow across the vibrating platform 20 is at the rate of approximately 65 feet per minute. The endless belt 80 on the first conveyor 22 is rotated at a speed greater than the speed of article travel along the vibrating platform 20 so that the articles 12 may be spaced apart along the conveyor 22 for easy alignment. In a preferred operation, the belt 80 is run at approximately 130 feet per minute. The belt speed of the endless belt 116 on the second conveyor 24 is relatively slower than the speed of the first conveyor belt 80. This slower speed allows a slower product flow and helps the observing and monitoring of the articles 12 as they pass the guide rods 108 on the conveyor 24. In a preferred operation, the speed of the endless belt 116 on the conveyor 24 is 90 feet per minute. These and other operational specifications may be employed in utilizing the present invention.

While in the foregoing there has been described a presently preferred embodiment of the present invention, it is to be understood that numerous modifications may be made to this invention without departing from the true spirit and scope thereof.

What is claimed is:

1. An article grouping apparatus for axially aligning articles into at least one column, said articles being of the type which are at least slightly out of square, said apparatus comprising, in combination, a base, an article receiving platform having an article receiving end and an exit end and being mounted on said base, said platform being inclined downwardly in the direction of travel of said articles, at least one trough means on said platform for accommodating said articles in said one column, a first surface on one side of said trough means, said surface being inclined downwardly toward said trough means, at least one guide means at the said article receiving end of said platform, said guide means being mounted angularly of said trough means and being upstream of said trough means for guiding said articles into said trough means, an opening in said inclined surface near said exit end for discharging articles which have not been aligned, and means for vibrating said platform for assisting in moving and axially aligning said articles along said platform.

2. The apparatus as set forth in claim 1 including at least one article aligning member connected to said inclined surface and adapted to engage and align non-aligned articles moving thereby.

3. The combination as set forth in claim 2 wherein said article aligning member is a substantially U-shaped wire member having ends which are connected to said first inclined surface.

4. The combination as set forth in claim 3 including a plurality of said wire members connected to said first inclined surface.

5. The apparatus as set forth in claim 1 including seven troughs and associated guide means adapted to receive the articles arranged in transverse rows having seven groups of articles with three articles in each group, each of said troughs adapted to receive one group of said articles.

6. The combination as set forth in claim 1 including an abutment connected to said inclined surface adjacent said discharge opening and intermediate the opening and the article exit end of said platform and adapted to cooperate with said opening to discharge non-aligned articles there through.

7. The apparatus as set forth in claim 1 wherein said vibrating means is connected to said platform at an angle with respect to said through.

8. The apparatus as set forth in claim 1 wherein said platform includes a plurality of said troughs and said associated guide means and said platform is divided into at least two separate platform sections mounted separately to said base.

9. The combination as set forth in claim 8 wherein said vibrating means includes at least two drive means separately connected to each of said platform sections for separately vibrating each of said sections.

10. The apparatus as set forth in claim 1 wherein said inclined surface is inclined gradually downward toward said troughs.

11. An article grouping apparatus for transporting and axially aligning substantially flat articles into at least two columns said articles being of the type which are at least slightly out of square, said apparatus comprising, in combination, means for receiving said articles, elongated trough means in said receiving means for accommodating said articles in at least two uniform columns, said receiving means and said trough means being inclined downwardly in the direction of article travel, means for vibrating said receiving means for assisting in moving and aligning said articles along said receiving means, first moving belt conveyor means for receiving said articles passing from the lower end of said receiving means, first and second spaced, fixed guide plow means mounted above said belt conveyor means and mounted at a first acute angle with respect to the direction of movement of said belt conveyor means and being directed towards one side of said belt conveyor means, said fixed guide plow means being spaced apart a distance which is greater than the major dimension of said articles, said conveyor means contacting one entire surface of each of said articles and moving said articles both with said conveyor means and laterally against said guide plow means while rotating said non-aligned articles in one direction into an axially aligned condition with other aligned articles as a result of the frictional effect from said guide plow means acting against said articles moving with said conveyor means.

12. The apparatus of claim 11 wherein said fixed guide plow means and said belt conveyor means are level.

13. The apparatus of claim 11 including second fixed guide plow means aligned for receiving said articles from said first guide plow means, said second guide plow means being mounted above said belt conveyor means and being mounted at a second acute angle with respect to the direction of movement of said belt conveyor means and towards the other side of said belt conveyor means, said conveyor means moving said articles both with said conveyor means and laterally against said second guide plow means for rotating non-aligned articles in an opposite direction into the axially aligned condition with other of said aligned articles as a result of the frictional effect from said second guide plow means acting against said articles moving with said conveyor means.

14. The apparatus of claim 13 wherein said second angle is less than said first angle for stabilizing said articles in passing from said first guide plow means to said second guide plow means.

15. The apparatus of claim 11 including second conveyor belt means for receiving and transporting articles away from said first belt conveyor means, elongated means mounted above said conveyor means for guiding said articles into an aligned condition along said second conveyor means for readily observing and monitoring said aligned articles.

16. The apparatus of claim 15 including at least one pair of guide rail means mounted above said second belt conveyor means and being tapered toward each other in the direction of article travel for receiving said articles from said guiding means for completing the aligning and columnating of said articles for further processing.

17. A method for axially aligning substantially flat articles into at least two columns, said articles being of the type which are slightly out of square, said method comprising the steps of moving said articles along an inclined path of travel, axially aligning at least a portion of said articles into at least two spaced single columns during movement in said inclined path of travel, discharging at least a portion of said articles which have not been aligned, moving said non-discharged articles in a flattened condition in said columns and along a path of travel, providing a pair of fixed guide means for each of said columns, spacing each pair of said guide means apart a distance which is greater than the major dimension of said articles, passing said columns of articles between said guide means, rotating non-aligned articles in said flattened condition, by frictional forces of said non-aligned articles acting laterally against at least one of said guide means during movement along said path of travel into said axially aligned path of travel, and passing said aligned articles from said path of travel for further processing.

18. The method of claim 17 wherein said rotating step includes first rotating said articles in one direction and then rotating said articles in an opposite direction, and said path of travel is level.

19. An article grouping apparatus for transporting and axially aligning articles into at least one column, said articles being of the type which are at least slightly out of square, said apparatus comprising, in combination, means for receiving said articles, elongated trough means in said receiving means for accommodating said articles in at least one uniform column, said receiving means and said trough means being inclined downwardly in the direction of article travel, means for vibrating said receiving means for assisting in moving and aligning said articles along said receiving means, first belt conveyor means for receiving said articles passing from the lower end of said receiving means, means in said receiving means for discharging non-aligned articles from said apparatus before said articles pass to said first belt conveyor means, first fixed guide plow means mounted above said belt conveyor means and mounted at a first acute angle with respect to the direction of movement of said belt conveyor means and being directed towards one side of said belt conveyor means, said conveyor means moving said articles both with said conveyor means and laterally against said guide plow means while rotating said non-aligned articles in one direction into an axially aligned condition with other aligned articles as a result of the frictional effect from said guide plow means.

\* \* \* \* \*